(12) United States Patent
Kehtarnavaz et al.

(10) Patent No.: US 7,576,797 B2
(45) Date of Patent: Aug. 18, 2009

(54) AUTOMATIC WHITE BALANCING VIA ILLUMINANT SCORING AUTOEXPOSURE BY NEURAL NETWORK MAPPING

(75) Inventors: Nasser Kehtarnavaz, Plano, TX (US); Hyuk-Joon Oh, College Station, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1479 days.

(21) Appl. No.: 10/179,870

(22) Filed: Jun. 25, 2002

(65) Prior Publication Data
US 2003/0020826 A1      Jan. 30, 2003

Related U.S. Application Data

(60) Provisional application No. 60/300,627, filed on Jun. 25, 2001.

(51) Int. Cl.
H04N 5/247 (2006.01)
H04N 5/225 (2006.01)
H04N 5/235 (2006.01)
H04N 9/73 (2006.01)

(52) U.S. Cl. .................. 348/364; 348/362; 348/229.1

(58) Field of Classification Search .............. 348/223.1, 348/229.1, 362, 364–366, 272, 280; 382/171
See application file for complete search history.

(56) References Cited

U.S. PATENT DOCUMENTS

| 4,741,046 | A | * | 4/1988 | Matsunawa et al. | 382/176 |
|---|---|---|---|---|---|
| 4,969,045 | A | * | 11/1990 | Haruki et al. | 348/229.1 |
| 5,223,935 | A | * | 6/1993 | Tsuji et al. | 348/364 |
| 5,448,502 | A | * | 9/1995 | Kindo et al. | 382/165 |
| 5,703,644 | A | * | 12/1997 | Mori et al. | 348/363 |
| 5,724,456 | A | * | 3/1998 | Boyack et al. | 382/274 |
| 6,038,339 | A | * | 3/2000 | Hubel et al. | 382/162 |
| 6,080,104 | A | * | 6/2000 | Ozawa et al. | 600/180 |
| 6,573,932 | B1 | * | 6/2003 | Adams et al. | 348/224.1 |
| 2005/0110876 | A1 | * | 5/2005 | Baqai et al. | 348/222.1 |

OTHER PUBLICATIONS

Wikipedia, the free encyclopedia, Standard Deviation, 2006, http://en.wikipedia.org/wiki/Standard_deviation, pp. 1-7.*
Funt, Brian et al; Learning Color Constancy; School of Computing Science, Simon Fraser University, Vancouver, CA.
Cooper, Ted; Color Segmentation as an Aid to White Balancing for Digital Still Cameras; Proceedings of the SPIE vol. 4300 (2001); pp. 164-171.

* cited by examiner

*Primary Examiner*—David L Ometz
*Assistant Examiner*—Carramah J Quiett
(74) *Attorney, Agent, or Firm*—Mima G. Abyad; Wade J. Brady, III; Frederick J. Telecky, Jr.

(57) ABSTRACT

Automatic white balancing and/or autoexposure as useful in a digital camera extracts color channel gains from comparisons of image colors with reference colors under various color temperature illuminants and/or extracts exposure settings from illuminance mean, illuminance variance, illuminance minimum, and illuminance maximum in areas of an image with a trained neural network.

3 Claims, 8 Drawing Sheets

FIG. 10

| COLOR TEMPERATURE | 2500K | 3500K | 4500K | 5500K | 6500K | 7500K | 8500K | 9500K | 10500K |
|---|---|---|---|---|---|---|---|---|---|
| FRAME 1 | | | | | | | | | |
| B SCORES | 0 | 0 | 0 | 1 | 1 | 1 | 0 | 0 | 0 |
| TEMPORAL MEM | 0 | 0 | 0 | 1 | 1 | 1 | 0 | 0 | 0 |
| FRAME 2 | | | | | | | | | |
| B SCORES | 0 | 0 | 0 | 0 | 1 | 1 | 0 | 0 | 0 |
| TEMPORAL MEM | 0 | 0 | 0 | 0 | 2 | 2 | 0 | 0 | 0 |
| FRAME 3 | | | | | | | | | |
| B SCORES | 0 | 0 | 1 | 0 | 1 | 1 | 0 | 0 | 0 |
| TEMPORAL MEM | 0 | 0 | 1 | 0 | 3 | 3 | 0 | 0 | 0 |
| FRAME 4 | | | | | | | | | |
| B SCORES | 0 | 0 | 0 | 1 | 1 | 1 | 0 | 0 | 0 |
| TEMPORAL MEM | 0 | 0 | 0 | 1 | 4 | 4 | 0 | 0 | 0 |
| FRAME 5 | | | | | | | | | |
| B SCORES | 0 | 0 | 0 | 1 | 1 | 1 | 0 | 0 | 0 |
| TEMPORAL MEM | 0 | 0 | 0 | 2 | 5 | 5 | 0 | 0 | 0 |
| FRAME 6 | | | | | | | | | |
| B SCORES | 0 | 0 | 0 | 0 | 0 | 1 | 1 | 0 | 0 |
| TEMPORAL MEM | 0 | 0 | 0 | 1 | 4 | 5 | 1 | 0 | 0 |

AUTOMATIC WHITE BALANCING VIA ILLUMINANT SCORING AUTOEXPOSURE BY NEURAL NETWORK MAPPING

CROSS-REFERENCE TO RELATED APPLICATIONS

This application claims priority from provisional application: Ser. No. 60/300,627, filed Jun. 25, 2001. The following pending patent applications disclose related subject matter: Ser. No. 09/632,543, filed Aug. 4, 2000. These referenced applications have a common assignee with the present application.

BACKGROUND OF THE INVENTION

The invention relates to electronic devices, and more particularly to digital cameras and white balancing and/or autoexposure methods and circuitry.

There has been a considerable growth in the sale and use of digital cameras in the last few years. Nearly 10 M digital cameras were sold worldwide in 2000, and this number is expected to grow to 40 M units by 2005. This growth is primarily driven by the consumer's desire to view and transfer images instantaneously.

FIG. 2 is a block diagram of the various image processing components, collectively referred to as image pipeline, in a typical digital still camera (DSC). Color filter array (CFA) interpolation, gamma correction, white balancing, color space conversion, and JPEG/MPEG compression/decompression constitute some of the key image pipeline algorithms. Note that the typical color CCD consists of a rectangular array of photosites with each photosite covered by a filter: either red, green, or blue. In the commonly-used Bayer pattern one-half of the photosites are green, and one-quarter are red, and one-quarter are blue. And the color conversion from RGB to YCbCr (luminance, chrominance blue, and chrominance red) used in JPEG/MPEG is defined by:

$$Y = 0.299\,R + 0.587\,G + 0.114\,B$$

$$Cb = -0.16875\,R - 0.33126\,G + 0.5\,B$$

$$Cr = 0.5\,R - 0.41859\,G - 0.08131\,B$$

so the inverse conversion is:

$$R = Y + 1.402\,Cr$$

$$G = Y - 0.34413\,Cb - 0.71414\,Cr$$

$$B = Y + 1.772\,Cb$$

where for 8-bit colors the R, G, and B will have integer values in the range 0-255 and the CbCr plane will be correspondingly discrete.

The color of a scene in an image appears different depending on the illumination under which the image is taken. This is due to the fact that different illumination sources, such as daylight, incandescent light, and fluorescent light, have different power spectral distributions. As a result, an object may appear to have a color different than its true color. The color most affected by this phenomena is white. Hence, the problem of making a white object to appear as white under different illuminants is called white balancing. This problem is normally solved by adjusting the gains of the three primary colors red, green, and blue of the CCD/CMOS sensor. The capability to do white balancing automatically without any user intervention is called automatic white balancing (AWB).

It is relatively easy to white balance a professional camera having manual white balance controls. This is done by zooming into a pure white object such that the object occupies the full frame. By pushing the white balance button, the color channel gains are adjusted. This way the camera balances its electronics so that the object specified as white is viewed and treated as white. Whenever the dominant light source changes, such as going from outdoors to indoors or from sunlight to shadow, this process needs to be repeated. On some cameras, manual white balancing is done by selecting a predefined set of light source settings such as "indoor", "sunny", "cloudy", etc.

As far as automatic white balancing is concerned, both hardware and software solutions have been proposed. The hardware solution normally consists of using the average color of the scene to zero-out any color bias via an electronic circuitry. The main assumption made here is that the average color in the scene is neutral or gray (colorless). For scenes involving strong, dominant color objects where there is a bias in the average color, this assumption does not hold and the white balancing circuits cannot properly compensate. The use of programmable processors in digital cameras has made it possible to introduce software solutions to AWB by merely examining the raw image data captured by the CCD/CMOS sensor. The advantage of such solutions is the flexibility obtained in software upgrading and reusability The most widely used technique for automatic white balancing is based on the "gray-world" assumption. This assumption states that the average of the colors in a scene is neutral or colorless. Let $k_r$, $k_g$, and $k_b$ be the scale factors or gains for the R, G, and B channels, respectively. These scale factors are determined as follows $$k_r = \max\{R_{avg}, G_{avg}, B_{avg}\}/R_{avg}$$

$$k_g = \max\{R_{avg}, G_{avg}, B_{avg}\}/G_{avg}$$

$$k_b = \max\{R_{avg}, G_{avg}, B_{avg}\}/B_{avg}$$

where $R_{avg}$, $G_{avg}$, and $B_{avg}$ denote the average red, green, and blue values, respectively, in the image.

Another commonly used technique is based on the "white-world" assumption. The white world assumption states that the red, green, and blue values of the brightest point in the image should be the same. Based on this assumption, the gains are adjusted as follows $$k_r = \max\{R_{max}, G_{max}, B_{max}\}/R_{max}$$

$$k_g = \max\{R_{max}, G_{max}, B_{max}\}/G_{max}$$

$$k_b = \max\{R_{max}, G_{max}, B_{max}\}/B_{max}$$

where $R_{max}$, $G_{max}$, and $B_{max}$ denote the maximum red, green, and blue values, respectively, in the image.

Although the above assumptions lead to white balancing in many situations, they fail when the scene contains a relatively large background or a large object having the same color. For example, images having a wide blue sky or ocean background fall into this category.

Some researchers have thus developed solutions by making weaker assumptions about the scene. Hubel et al, U.S. Pat. No. 6,038,339 discloses a color by correlation scheme where the convex hull of a number of reference colors in chromaticity space under a specified illuminant are compared to the colors of the captured image. By correlating the captured image to the reference convex hulls for a set of illuminants, the most likely illuminant is identified. Other solutions have included the use of a neural network to map image chromaticities into primary color gains (Funt et al., Learning Color Constancy, IS&T Proc. Fourth Color Imagining Conf. pp. 58-60 (1996)), and finding the near neutral objects for removing color casts (Cooper et al., Color Segmentation as an Aid to White Balancing for Digital Still Cameras, Proc. SPIE, vol. 4300, 99.16141 (2001)).

Color temperature is measured in Kelvins (K). It indicates the color of a black body radiator when heated to that temperature expressed in Kelvins. This color depends on the spectral radiation distribution of the black body at the specified temperature. On the Kelvin scale, the lower the color temperature, the redder the object appearance becomes, and the higher the color temperature, the bluer the object appearance becomes. For example, sunlight has a color temperature of about 5500 K, and a 100-watt incandescent light bulb has a color temperature of 2800 K. The human eye automatically adjusts to color temperature. In other words, the color of an object as seen by the eye is perceived to be the same when the object is viewed under different light sources. This is not the case when the object is seen through a digital camera. The color of the object appears differently depending on the light source under which the image is captured. As far as color appearance in a digital image is concerned, studies have shown that viewers prefer to see more saturated or stronger colors in the image. For example, viewers prefer to see skin tones healthier, grass greener, and sky bluer than they actually are.

Because the spectral distribution of a captured color consists of the product of the source (illuminant) spectral power distribution and the scene spectral reflectances, changing the source spectral distribution alters the product. Indeed, given a surface reflectance $S(\lambda)$, an illuminant spectral distribution $E(\lambda)$, and the three primary spectral sensitivities of the standard observer or sensor, $r(\lambda)$, $g(\lambda)$, and $b(\lambda)$, then the red, green and blue components R, G, and B of a captured color can be written as:

$$R = k_r \int S(\lambda) E(\lambda) r(\lambda) d\lambda$$

$$G = k_g \int S(\lambda) E(\lambda) b(\lambda) d\lambda$$

$$B = k_b \int S(\lambda) E(\lambda) b(\lambda) d\lambda$$

Of course, in a CCD with a color filter array (CFA), each photosite only captures one of the three R, G, or B, and the other two are obtained by interpolation from neighboring photosites.

Automatic exposure in a digital still camera (auto exposure in FIG. 2) typically assesses luminance levels and adjusts the exposure (time and/or aperture size). Another approach as in the Nikon F5 camera, a neural network is trained on 30,000 images to relate exposure value to parameter values of the following image parameters: brightness of the entire image, brightness of the focus area, contrast of the entire image, contrast of the lower and upper parts of the image, color temperature, position of focus, and distance from the object.

SUMMARY OF THE INVENTION (34769)

The present invention provides camera systems and methods of autoexposure with neural networks trained to relate image exposure to the parameters of the set illuminance mean, illuminance variance, illuminance minimum, and illuminance maximum in subareas of an image. Other preferred embodiments include automatic white balancing with the autoexposure.

This has advantages including autoexposure using only the captured image.

BRIEF DESCRIPTION OF THE DRAWINGS

The drawings are heuristic for clarity.

FIG. 10 illustrates a temporal preferred embodiment scoring.

DETAILED DESCRIPTION OF THE PREFERRED EMBODIMENTS

1. Overview

Figure 1A:
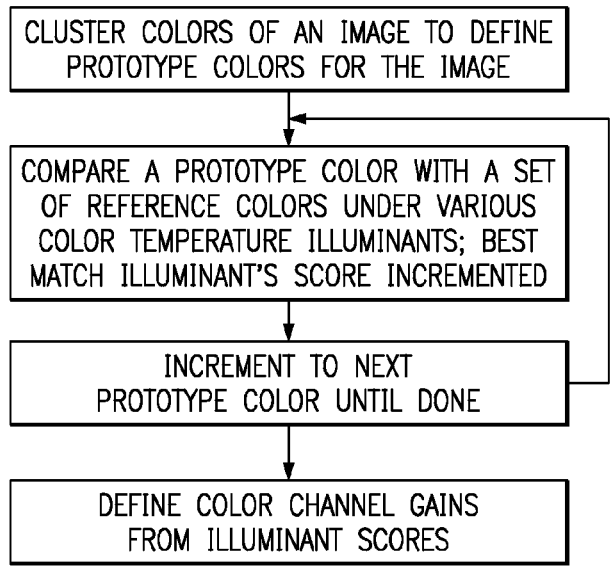
FIGS. 1a-1c are flow diagrams and image partition for preferred embodiment automatic white balancing and autoexposure methods.

Preferred embodiment digital camera systems include preferred embodiment automatic white balancing methods which extract color channel gains from comparisons of image prototype colors with reference colors at various color temperature illuminations. FIG. 1a is a flow diagram for a first preferred embodiment automatic white balancing method which extracts a small number (e.g., 5-20) of prototype colors from an image and compares these prototype colors to a small set (e.g., 240) of reference color-illuminant combinations. The reference color-illuminant combinations which best compare to the prototype colors determine a presumed mixture of illuminants for the image and consequent red, green, and blue gains.

Other preferred embodiment digital camera systems include preferred embodiment automatic exposure (autoexposure) methods which extract exposure settings from image parameters including illuminance mean, illuminance variance, illuminance minimum, and illuminance maximum in subareas of an image. The preferred embodiments use a trained neural network to extract the exposure settings from the illuminance parameters; see FIG. 1b.

Further preferred embodiments include both a preferred embodiment automatic white balancing and a preferred embodiment autoexposure.

Figure 2:
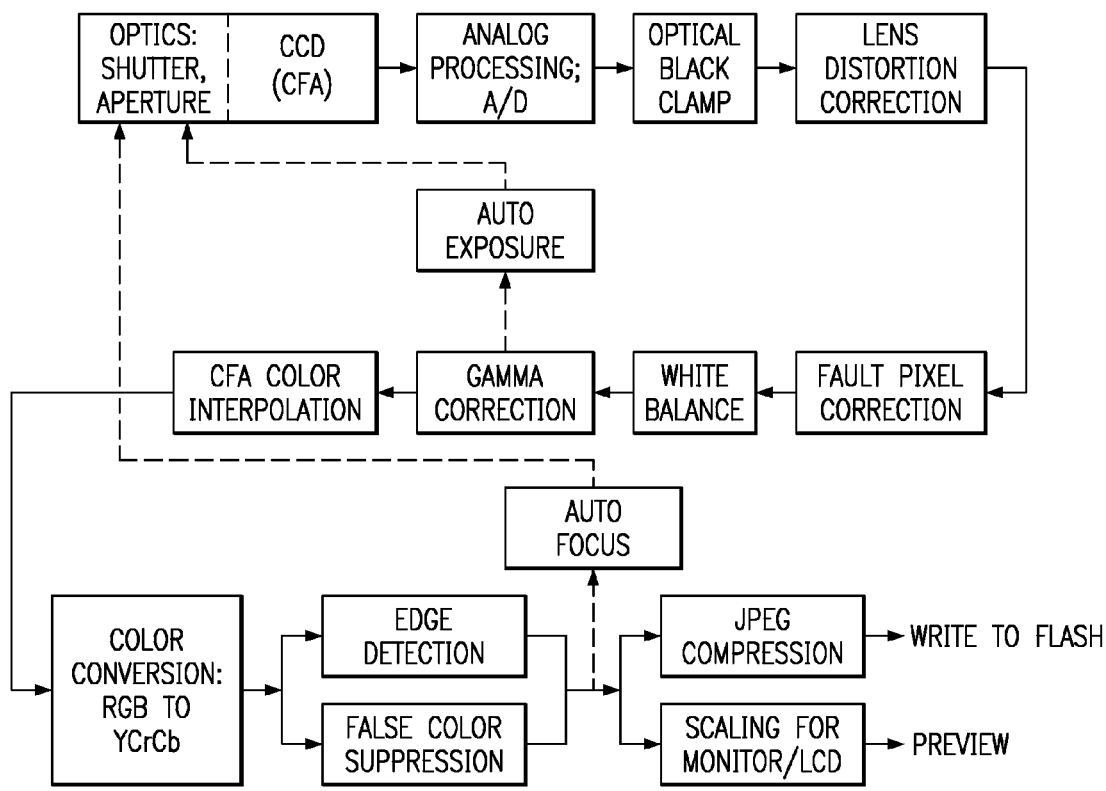
FIG. 2 shows a camera system.

FIG. 2 shows in functional block form a system (camera) which may incorporate preferred embodiment automatic white balancing methods and also preferred embodiment autoexposure methods. The functions of FIG. 2 can be performed with digital signal processors (DSPs) or general purpose programmable processors or application specific circuitry or systems on a chip such as both a DSP and RISC processor on the same chip with the RISC processor controller. Further specialized accelerators, such for CFA color interpolation and JPEG encoding, could be added to a chip with a DSP and a RISC processor. Captured images could be stored in memory either prior to or after image pipeline processing. The image pipeline functions could be a stored program in an onboard or external ROM, flash EEPROM, or ferroelectric RAM for a DSP or programmable processor.

2. First Preferred Embodiment White Balancing

The first preferred embodiment white balancing methods have three parts: (1) defining a number of reference colors, (2) obtaining a set of prototype or representative colors from the image under examination, and (3) performing a color matching procedure between the reference and prototype colors.

(1) In the first part, the spectral distributions associated with the Macbeth reference color chart (24 colors) together with the spectral distributions of a number (e.g., 10) of reference light sources corresponding to a set of color temperatures are used to obtain a number of reference color points in the CbCr space (e.g., 240 color points). The Macbeth colors attempt to summarize commonly encountered colors with a small set of reference colors, including neutrals (black, grays, and white).

Figure 3:
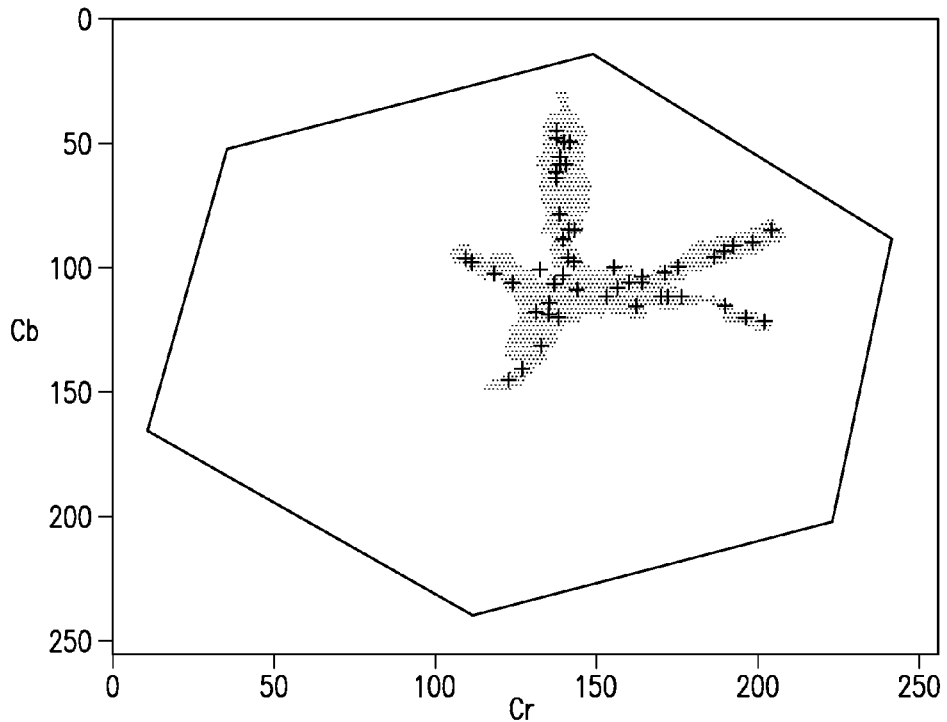
FIG. 3 shows an image histogram and preferred embodiment field function peaks.

(2) The second part of the method involves the establishment of a number of representative colors (prototype colors) for the image under examination. This is done by using a simplified version of the multi-scale clustering method developed by Kehtarnavaz et al. In this method, a two-dimensional color histogram of the image colors in CbCr space is used to set up a potential field function by convolving the histogram with a Gaussian kernel. Note that CbCr space being discrete (a subset of a 256 by 256 rectangular matrix due to the typical 8-bit memory) leads to a two-dimensional histogram of the ~1 M image points in CbCr. Then, the local maxima of the potential field function are used to define prominent or prototype colors representing the image. FIG. 3 shows the two-dimensional histogram of a sample image with the peaks labeled by '+'. The branching of the image colors from the center in CbCr space as in FIG. 3 is common; the center of CbCr space corresponds to neutral (black, gray, white). The number of prototype colors found for an image typically lies in the range of 5-20 with 8-12 common. Thus there would be 8-12 prototype colors to compare with the 240 reference colors.

In more detail, the multi-scale cluster method proceeds as follows: convolve the histogram of image colors in CbCr space with a sequence of gaussian kernels having increasing sizes (standard deviations); that is, kernels $\exp[-|x|^2/2\sigma^2]/2\pi\sigma^2$ where $|x|$ is the length of a two-dimensional vector x in CbCr space and $\sigma$ is the standard deviation. These convolutions generate a sequence of field functions which become progressively smoother as a increases. The gaussian kernels and resulting field functions are considered functions of a two-dimensional continuous variable, and for the convolution the histogram is cast as a sum of scaled delta functions located at points (n,m) of the two-dimensional variable with m and n integers and $0 \leq m \leq 255$ and $0 \leq n \leq 255$. The number of local maxima (minima if a negative sign is included) of the field functions decreases with increasing kernel size, and the number of local maxima which persists the longest as the kernel size increases is taken as the number of prototype colors and the prototype colors are the points in CbCr space corresponding to these local maxima. The range of normalized standard deviations may be something like $\sigma$=0.001, 0.002, . . . , 0.04, 0.045, 0.05, 0.055, 0.06, . . . , 1.0, where 1.0 corresponds to 255th bin.

Empirically, the gaussian kernel size (standard deviation) of 5 bins usually yields the persistent number of local maxima, so a simplified second preferred embodiment replaces the multi-scale clustering method of the first preferred embodiment by a single convolution of the gaussian kernel. Then the local maxima of this single field function are used as the prototype colors.

(3) The location of an image color in the CbCr color space is governed by two sources: (a) its hue (e.g., reflectance $S(\lambda)$), and (b) its shift due to the spectral distribution (e.g, $E(\lambda)$) of the light source under which the color is observed. In order to decouple (a) and (b) when comparing prototype colors to reference colors, the color space is divided into a number of sectors. The color points in each sector represent similar looking colors. Two approaches to setting up sectors can be adopted: one approach is to set up a fixed number of sectors, and another approach is to set up a variable number of sectors depending on the number of prototypes. The use of a fixed number of sectors, such as 8, is simpler.

Figure 4:
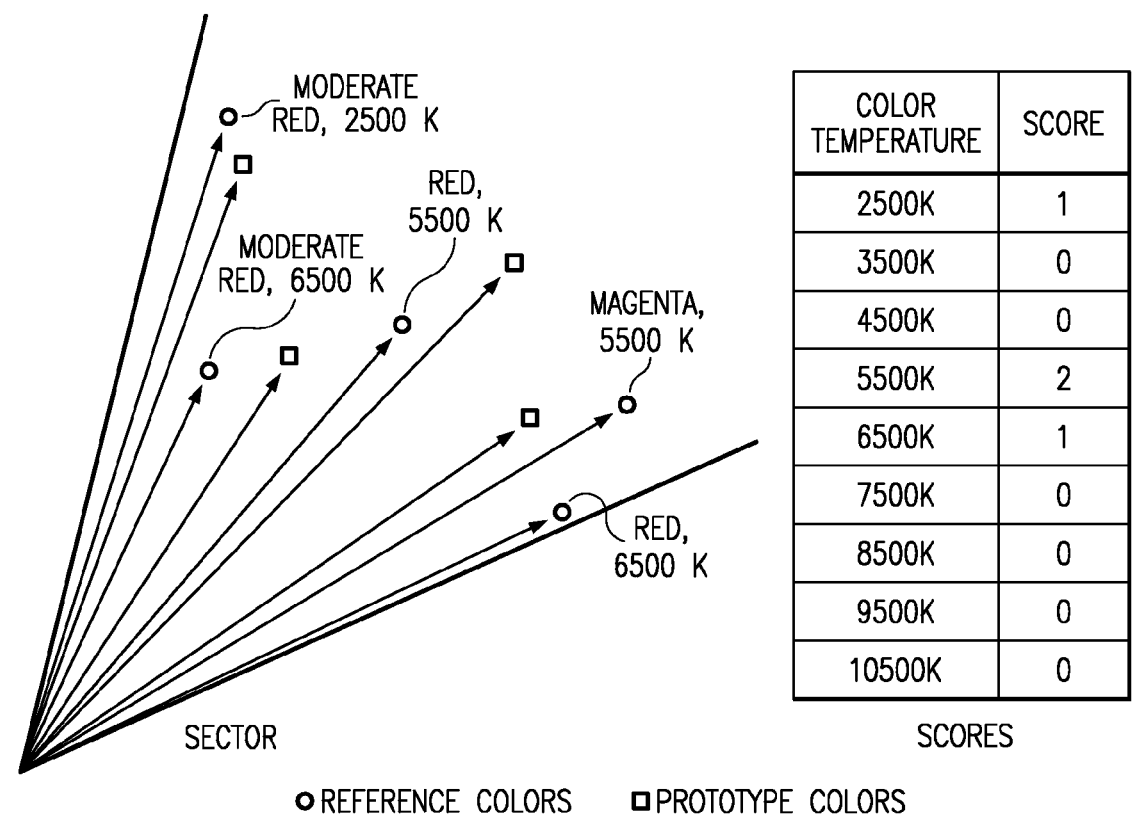
FIG. 4 illustrates a preferred embodiment illuminant scoring.
Figure 5A:
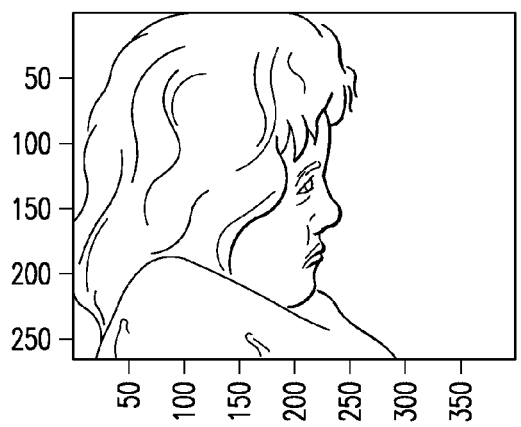
FIGS. 5-7 are experimental results.
Figure 5B:
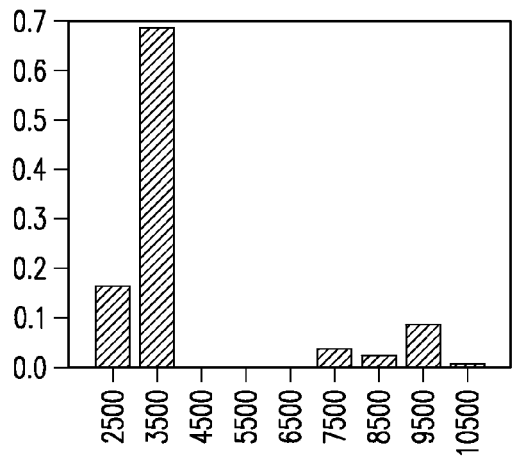

Within each sector, a prototype color is compared to all the reference colors (under one of the set of illuminants) in that sector. This is done by computing the closeness in hue of the prototype and the reference colors. For example, as shown in FIG. 4, this means that the product between the prototype color vector and the reference color vectors are computed where the vectors originate at the center of the CbCr space (corresponding to neutral colors). To keep track of the comparisons, first a score of zero is attached to each of the illuminants (color temperatures) under consideration. Then, the score of the illuminant associated with the closest or winning reference color in the prototype comparison is incremented by one. This process is repeated for each prototype in the sector. After examining all the sectors, the final scores of the illuminants are compared. Note that when a prototype vector is in a sector with no reference colors, then there is no closest reference and no score is incremented pursuant to this prototype. FIG. 5b shows a bar chart illustrating the scores of the illuminants for the image shown in FIG. 5a which had incandescent lighting. As seen from FIG. 5b, the 3500K color temperature generates the highest score as expected. Additional examples for sunlight and overcast ski are shown in FIGS. 6 and 7, respectively. Note that sectoring cuts down on the number of comparisons and also precludes finding a closest reference color for a prototype color when there are no reference colors in the sector containing the prototype color. Otherwise, sectoring has minimal effect on the comparisons Finally, for white balancing, the primary color gains are adjusted based on the average of the gains associated with the neutral colors of the Macbeth reference colors. The following table lists the white balanced gains of these neutral colors for different color temperature illuminants for a particular camera (measured by manufacturer).

| color temp | $k_r$ | $k_g$ | $k_b$ |
| --- | --- | --- | --- |
| 2500 K | 0.62500 | 1.00000 | 1.75000 |
| 3500 K | 0.81250 | 1.00000 | 1.75000 |
| 4500 K | 1.00000 | 1.00000 | 1.75000 |
| 5500 K | 1.09375 | 1.00000 | 1.75000 |
| 6500 K | 1.40625 | 1.00000 | 1.75000 |
| 7500 K | 1.40625 | 1.00000 | 1.68750 |
| 8500 K | 1.40625 | 1.00000 | 1.65625 |
| 9500 K | 1.40625 | 0.96875 | 1.46875 |
| 10500 K | 1.40625 | 0.93750 | 1.25000 |

Figure 5C:
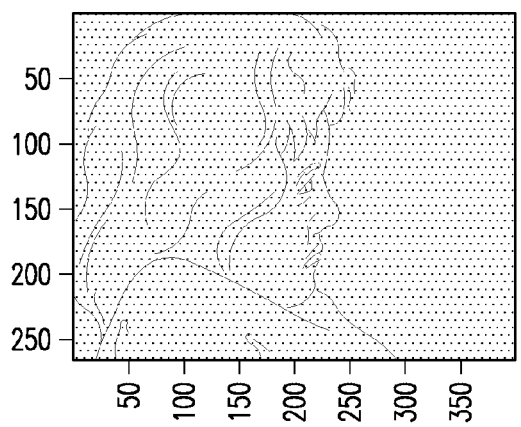
Figure 5D:
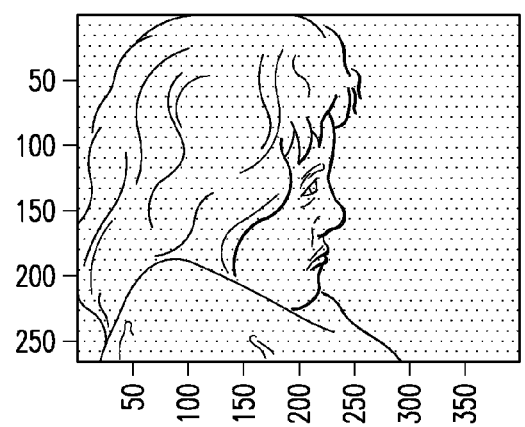
Figure 6A:
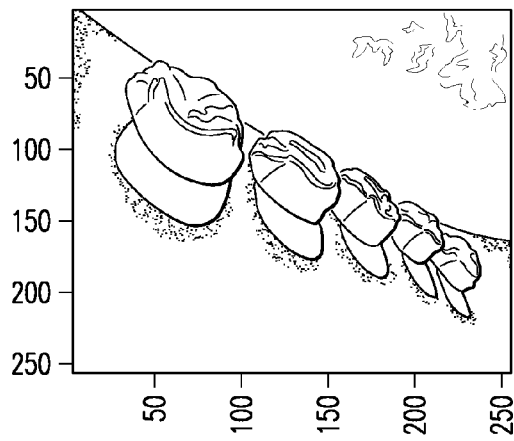
Figure 6B:
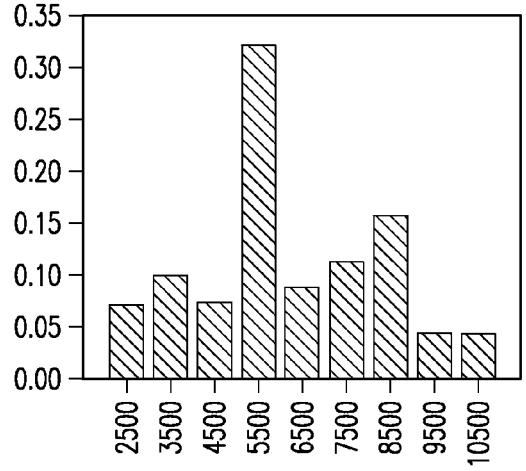
Figure 6C:
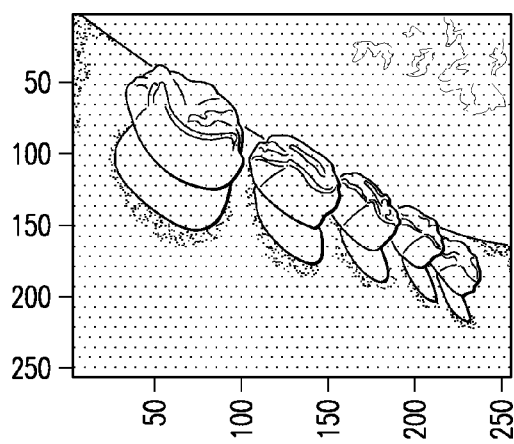
Figure 6D:
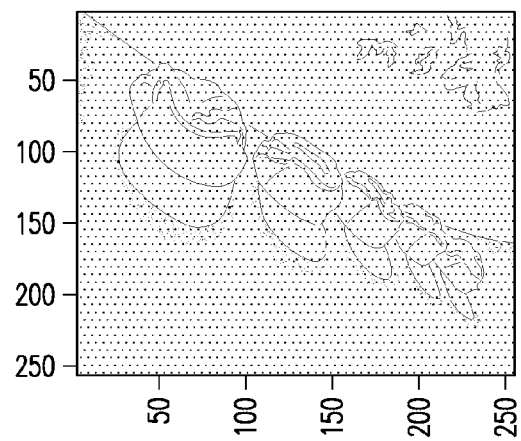
Figure 7A:
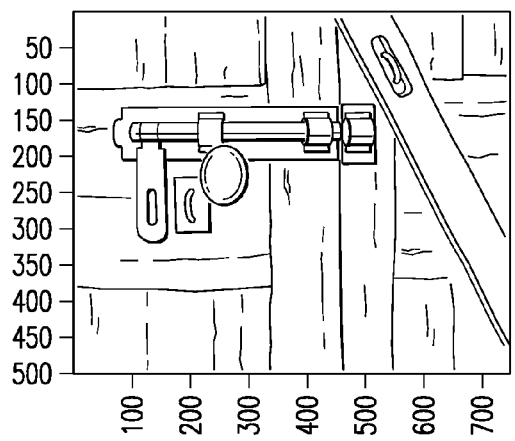
Figure 7B:
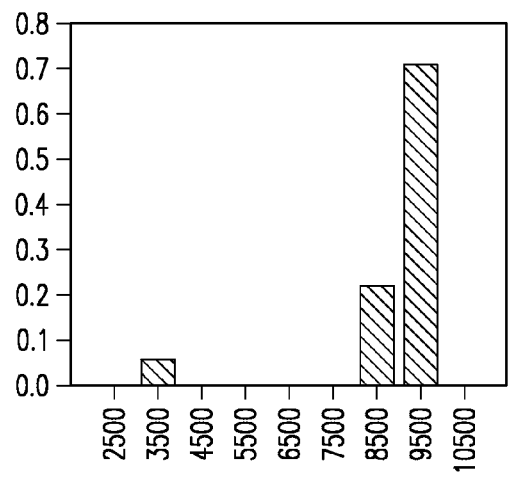
Figure 7C:
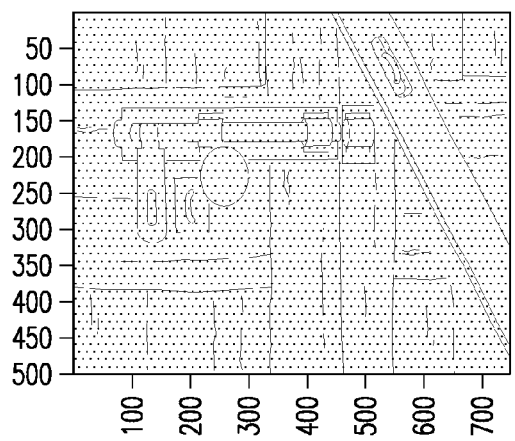
Figure 7D:
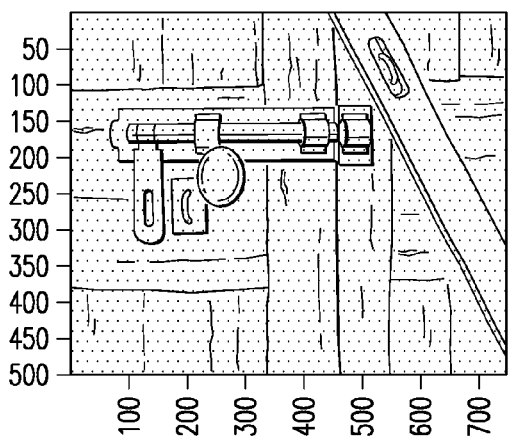

For example, with the scoring outcome shown in FIG. 5b, the gains are combined by taking 69 percent of 3500K light, 16 percent of 2500K light, 4 percent of 7500K light, 2 percent of 8500K light, 8 percent of 9500K light and 1 percent of 10500K light. FIG. 5c shows the white world presumption white balancing resultant image for the FIG. 5a input, and FIG. 5d the preferred embodiment white balancing resultant image.

3 Low Complexity Preferred Embodiment White Balancing

Third preferred embodiment white balancing methods vary two implementation aspects of the first and second preferred embodiment white balancing methods: (a) lack of luminance information in the CbCr space causing the color appearance to change under different brightness levels of the same light source, and (b) the required processing time and memory usage associated with the two-dimensional CbCr histogram. The third preferred embodiment illuminant scoring methods are modifications of those of the prior preferred embodiments.

Figure 8:
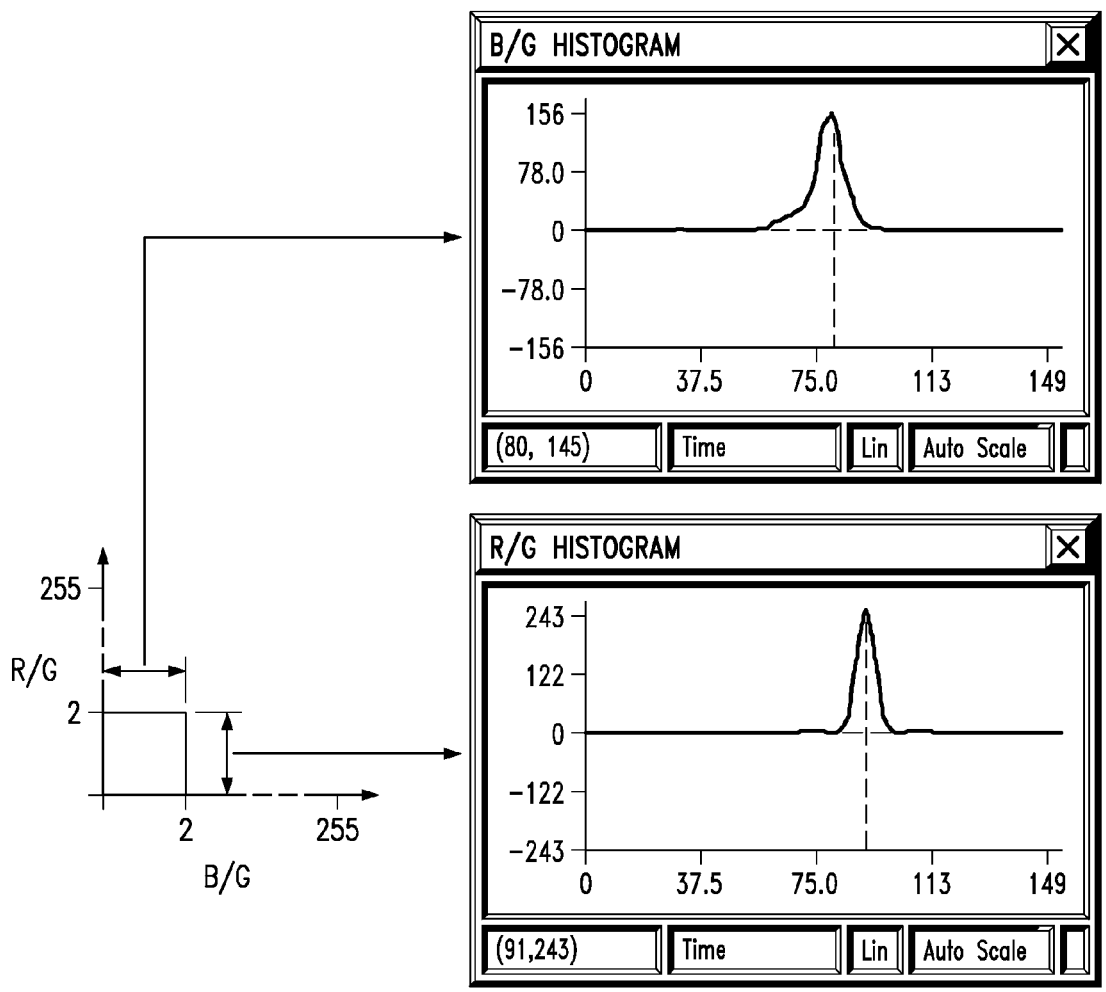
FIG. 8 shows a color space.

The first modification is to operate in the color space r=R/G and b=B/G in order to eliminate the effect of intensity. This space allows the normalization of RGB under different intensity or brightness levels. However, unlike the CbCr space, similar colors do not fall into a well-defined geometric area. In the rb space, however, it is seen that near neutral colors fall in the subarea r≦2 and b≦2 shown in FIG. 8. As a result, the match between prototype colors and reference colors is limited to this subarea incorporating near neutral colors.

Figure 9:
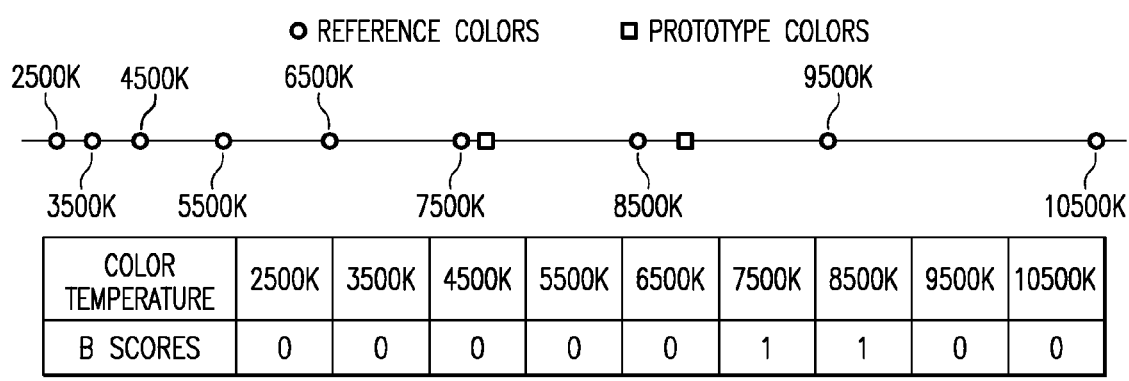
FIG. 9 illustrates preferred embodiment one-dimensional histogram comparison and scoring.

The second modification involves using two one-dimensional histograms corresponding to r and b instead of using the two-dimensional CbCr histogram. The prototypes are then defined by intersecting the peaks of the field functions formed by one-dimensional gaussian convolutions of the one-dimensional histograms. For computational convenience rescale the r and b variables in the subarea to ranges such as 0 to 150. Again, two preferred embodiments: (1) use a standard deviation of the gaussians as experimentally determined, or (2) use a sequence of standard deviations, and determine persistence. This approach significantly decreases the computation time and the memory usage for implementation. Note that typically 2-3 peaks in the one-dimensional field functions arise to define prototype colors. And the comparisons to the closest reference color-illuminant combination in the neutral subarea may be either (1) two one-dimensional comparisons using binary scoring due to the small number of reference color-illuminant combinations and prototype colors in the subarea (see FIG. 9), or (2) proceed as before, and sectoring may be omitted. Indeed, the colors typically fall along the curved line in the upper righthand quadrant of the neutral subarea shown in FIG. 8.

4. Temporal Preferred Embodiments

In realistic lighting conditions, there exist slight color fluctuations over time. To provide a stable response to such color fluctuations, a temporal membership scheme is set up. This involves examining a number of frames to see which color temperature lasts the longest in time. FIG. 10 shows an example where the temporal membership preferred embodiment is used to identify the color temperature of 7500 after examining 6 frames. In particular, when an illuminant scores in a frame, then its temporal score is incremented; whereas, when an illuminant fails to score in a frame, then its temporal score is decremented. The illuminant scores saturate at 5, and the scores determine the mixture used with the color channel gains in the table of the first preferred embodiments.

5. Autoexposure

Figure 1B:
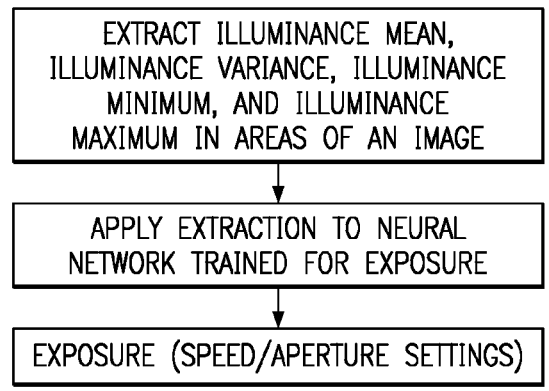

Preferred embodiment autoexposure methods in preferred embodiment systems such as FIG. 2 use a trained neural network approach as per FIG. 1b. Exposure is the term used to refer to the amount of light reaching the camera from different parts of a scene. An overexposed image looks bleached out and an under-exposed image looks two dark. The amount of light reaching a film or a CCD sensor is determined primarily by two factors: exposure time controlled by shutter speed, and aperture size. In consumer digital cameras, one of the image pipeline tasks includes auto-exposure (AE). This module provides the right amount of exposure or image brightness by changing exposure time and aperture size in an automatic manner. In digital cameras, shutter speed or exposure time can be controlled electronically as well as mechanically. In addition to shutter speed and aperture size, the gains of the analog front end (AFE) in digital cameras can be used to alter sensitivity leading to a change in exposure.

In photography, the term stop is used to indicate a factor of 2 change in exposure. In other words, increasing exposure by a stop doubles the amount of light, and decreasing exposure by a stop halves the amount of light reaching the camera. In video cameras, shutter speed is usually fixed by the user and automatic exposure is primarily achieved by altering aperture size. In digital cameras, both shutter speed and aperture size are altered in order to achieve auto-exposure.

A stop in speed translates into a doubling or halving of exposure time. This is due to the fact that exposure varies linearly with exposure time. Digital cameras normally emulate the familiar sequence of stops in speed encountered in film cameras, namely 1, 1/2, 1/4, 1/8, 1/15, 1/30, 1/60, 1/125, 1/250, 1/500, 1/1000, 1/2000 sec. A stop in aperture requires doubling or halving of aperture area. For circular apertures, this translates into opening or closing the iris diameter by the square root of 2 or approximately 1.4. Aperture stops are expressed in terms of a fraction of the lens focal length or the familiar F-numbers:

F1, F/1.4, F/2, F/2.8, F/4, F/5.6, F/8, F/11, F/16, F/22.

In photography, the principle of reciprocity is used to obtain pairs of shutter speeds and aperture sizes for a specified amount of exposure. This principle states that there is a reciprocal relationship between shutter speed and aperture size, i.e.

$$Ev=Tv+Av, \quad (1)$$

where Ev denotes exposure value, Tv shutter speed value and Av aperture size value. For example, an equivalent exposure value of Ev=11 is obtained by using the following pairs of shutter speeds (T sec) and aperture sizes (A): (1/250–F/2), (1/60–F/5.6) and (1/15–F/11), where Ev is expressed in base-2 logarithm $$Ev=\log_2(A^2/T), Tv=\log_2(1/T), \text{ and } Av=\log_2(A^2) \quad (2)$$

As far as AE is concerned, a digital camera can be operated in three modes: (a) Program mode where both shutter speed and aperture size are set automatically. (b) Shutter priority mode where shutter speed is fixed by the user. This mode is normally used when capturing fast moving objects. If shutter speed is not set high enough to match the speed of the moving object, a blurred image of the object is obtained. (c) Aperture priority mode where aperture size is fixed by the user. This mode is normally used to control depth of field. The smaller the aperture, the greater portion of the scene depth will appear sharp in the image. For example, this is the mode selected for landscape photographing. The larger the aperture, the smaller portion of the scene depth will appear sharp in the image. For example, for portrait photographing by using this mode the close subject is brought into sharp focus and the background becomes soft or out of focus.

Exposure value is related or is a function of image brightness (Bv) and sensitivity (Sv), i.e.

$$Ev=f(Bv, Sv) \quad (3)$$

Sensitivity in film camera is related to the ISO number. In digital cameras, sensitivity is altered by changing the gains of the analog front end (AFE). The doubling of sensitivity or ISO lowers the signal-to-noise ratio (SNR) by about 70%. Similar to film cameras, sensitivity is often fixed at a nominal value to get an adequate SNR. For normal shots in the presence of adequate lighting and a relatively still subject, the use of the lowest possible ISO setting or sensitivity is recommended since as a result the sharpest and cleanest image is obtained. Although increasing sensitivity enhances the image graininess, it provides a higher exposure in low light situations where the use of flash is prohibited.

The main challenge in AE is how one relates the image brightness Bv to the exposure value Ev. In other words, how one defines the function f in (3). Some cameras are equipped with metering or photocell devices that provide the average brightness in the scene. A look-up table is then used to set the exposure value based on the average brightness. Various metering methods such as matrix, center-weighted, have been utilized to set the exposure value based on the average brightness of different subareas in the image. In contrast, the autoexposure preferred embodiments do not use such metering devices.

Most scenes produce an overall brightness of middle gray. Hence, in most cases, the use of average luminance generates a proper exposure. However, in scenes such as bright sand or snow-covered landscapes, the average brightness can be lighter or darker than the middle gray. For such situations, the middle gray approach does not lead to a proper exposure level. That is why some cameras allow exposure compensation where the exposure value can be changed manually by 1 or 2 stops. Also, for scenes consisting of both bright and dark areas, it is very difficult to achieve a perfect exposure level where the details in both bright and dark areas are retained. Again, for such situations, it is appropriate to use exposure compensation.

Most of the prior work on AE concerns video-cameras and their electronic hardware for AE. For example, an image may be divided into a matrix of small sub-images and the average brightnesses in the sub-images are used to set up a reference brightness value. The reference value is then reached by adjusting the aperture size. A similar approach has been adopted for setting shutter speed. Further, a number of relationships and rules relating brightness to exposure have been presented which are derived via experimentation.

Another approach adopted by some digital camera manufacturers is to learn the brightness-exposure relationship for different lighting conditions via image examples. For example, in the Nikon F5 camera, a neural network module is trained using 30,000 sample images to relate the following parameters to exposure value: brightness of the entire image, brightness of the focus area, contrast of the entire image, contrast of the lower and upper parts of the image, color temperature, position of focus, and distance from object.

Between the above two approaches, the learning by examples approach provides a more robust solution due to the fact that it incorporates many different lighting conditions and types of photography. However, such an approach requires access to a large database of images captured under different lighting conditions.

Preferred embodiment autoexposure methods adopt the learning by examples approach by using a backpropagation neural network module to obtain the required exposure: change in shutter speed and/or aperture size. The preferred embodiment methods extract a number of luminance values from an image. These values are then fed into the trained neural network module to obtain a proper exposure value as output.

Figure 1C:
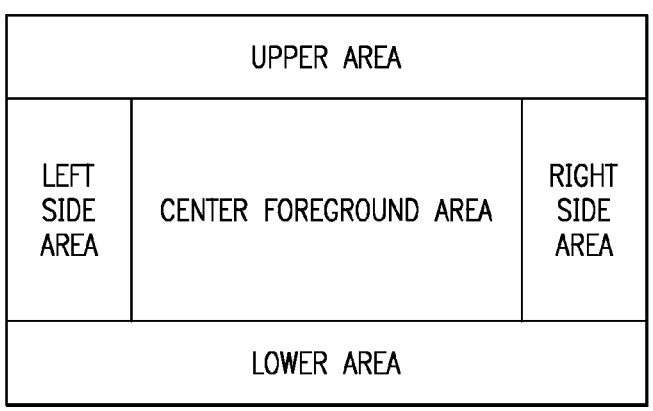

The preferred embodiment methods divide an image into five areas: a center foreground area, an upper area, a lower area, left side area, and right side area; see FIG. 1c. This division is done to allow the adaptation of AE to different types of photography, such as scenery and portrait, which require attaching different emphasis or weights to different areas. The histogram in each area is used to determine the mean luminance, variance of the luminance, minimum luminance, and maximum luminance for that area. The mean corresponds to the average brightness and the variance corresponds to the contrast. Contrast is a measure of brightness sharpness in the image. The same spatial information is computed for several previous frames to incorporate any luminance temporal changes into the network. Therefore, all together the number of inputs or cells in the network consists of 20 (5 areas times 4 luminance measures per area). The number of hidden layer network cells is determined by experimentation to generate the smallest mean square error. The number of output cells depends on the exposure value changes for which the network is trained for.

An alternative preferred embodiment AE would subdivide an image into many (e.g., 64) subareas and within each subarea measure the four inputs (mean, variance, minimum, and maximum luminance) and use a trained neural network with 256 (4 inputs per subarea*64 subareas) inputs for AE.

In addition to the neural network module, a further autoexposure preferred embodiment includes a second module designed for low light situations not modeled by the neural network. This second module adjusts the gain of the analog front end to increase the sensitivity or brightness level under such circumstances; such as adapting the AFE gain to the mean luminance of the image.

6. Modifications

The preferred embodiments may be modified in various ways while retaining one or more the features of illuminant scoring based on comparisons of prototype image colors to a set of reference color-illuminant combinations in a color space and autoexposure by a neural network trained on inputs of mean, variance, minimum, and maximum luminance.

For example, other color spaces could be used, such as r-b colors defined by $r=R/(R+G+B)$ and $b=B/(R+G+B)$; replacing sectoring with thresholding; the partitioning of the image into areas for autoexposure luminance measurements could include non-rectangular (e.g., wedge-shaped) areas.

What is claimed is:

1. A method of autoexposure, comprising:
   (a) partitioning an image into areas;
   (b) for each of said areas, extracting illuminance mean, illuminance variance, illuminance minimum, and illuminance maximum; and
   (c) determining exposure using all of the results of step (b).

2. The method of claim 1, wherein:
   (a) said determining of step (c) of claim 1 is with a trained neural network.

3. The method of claim 1, wherein:
   (a) said areas of an image consist of a center foreground area, an upper area, a lower area, a left side area, and a right side area.

* * * * *

UNITED STATES PATENT AND TRADEMARK OFFICE
CERTIFICATE OF CORRECTION

PATENT NO. : 7,576,797 B2
APPLICATION NO. : 10/179870
DATED : August 18, 2009
INVENTOR(S) : Kehtarnavaz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1991 days.

Signed and Sealed this

Seventh Day of September, 2010

David J. Kappos
*Director of the United States Patent and Trademark Office*